United States Patent [19]

Daniels et al.

[11] 4,217,497
[45] Aug. 12, 1980

[54] PORTABLE INSTRUMENT FOR MEASURING NEUTRON ENERGY SPECTRA AND NEUTRON DOSE IN A MIXED N-γ FIELD

[75] Inventors: Charles J. Daniels, Gaithersburg; Jeffrey L. Silberberg, Rockville, both of Md.

[73] Assignee: The United States of America as represented by the Department of Health, Education and Welfare, Washington, D.C.

[21] Appl. No.: 916,209

[22] Filed: Jun. 16, 1978

Related U.S. Application Data

[63] Continuation-in-part of Ser. No. 886,465, Mar. 14, 1978.

[51] Int. Cl.² ............................................. G01T 1/20
[52] U.S. Cl. ................................. 250/369; 250/390; 250/392
[58] Field of Search ............... 250/361 R, 363 R, 369, 250/390, 391, 392; 364/414

[56] References Cited

U.S. PATENT DOCUMENTS

| 2,795,703 | 6/1957 | Berlman et al. | 250/392 |
| 2,830,189 | 4/1958 | Scherbatskoy | 250/392 |
| 3,898,466 | 8/1975 | Kawashima | 250/390 |

*Primary Examiner*—Davis L. Willis
*Attorney, Agent, or Firm*—Browdy and Neimark

[57] ABSTRACT

A portable neutron spectrometer/kerma-rate meter for the measurement of the fast neutron component of mixed n-γ fields in the 1 to 15 MeV neutron energy range. The system includes an organic scintillation detector, pulse shape discrimination circuitry, a 1.4 μsec multichannel analyzer, an 8-bit microcomputer, and appropriate displays. The instrument is capable of both gathering and processing recoil-proton pulse-height data in the field.

18 Claims, 6 Drawing Figures

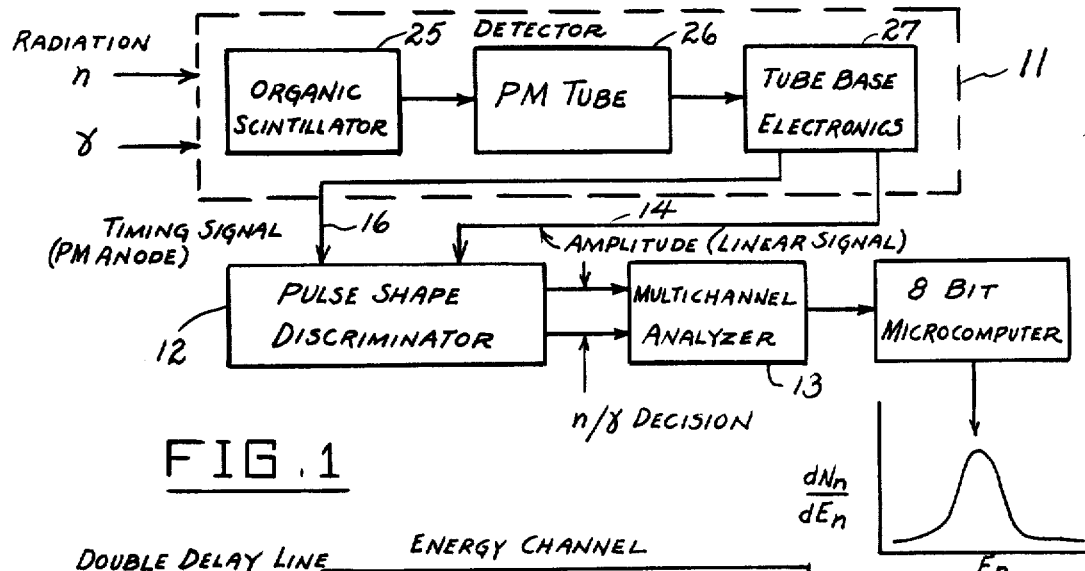
FIG. 1
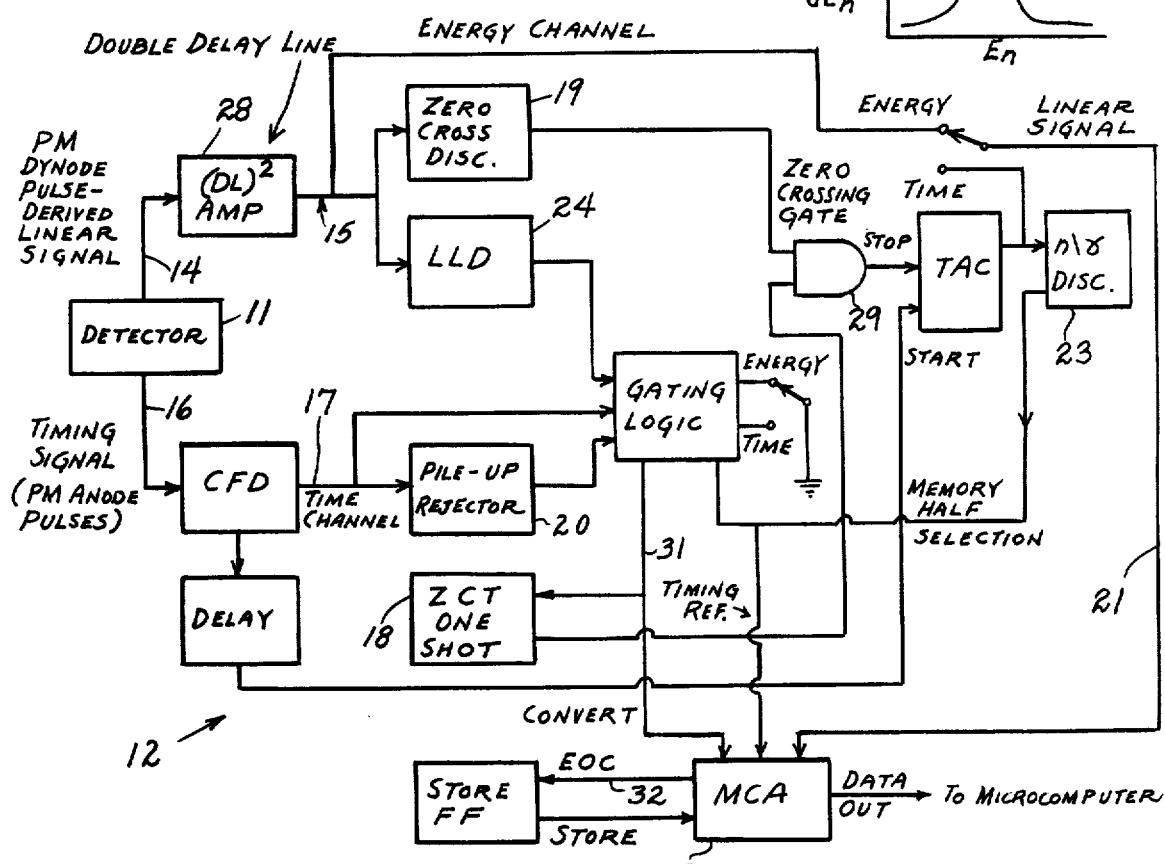
FIG. 2  PSD Block Diagram

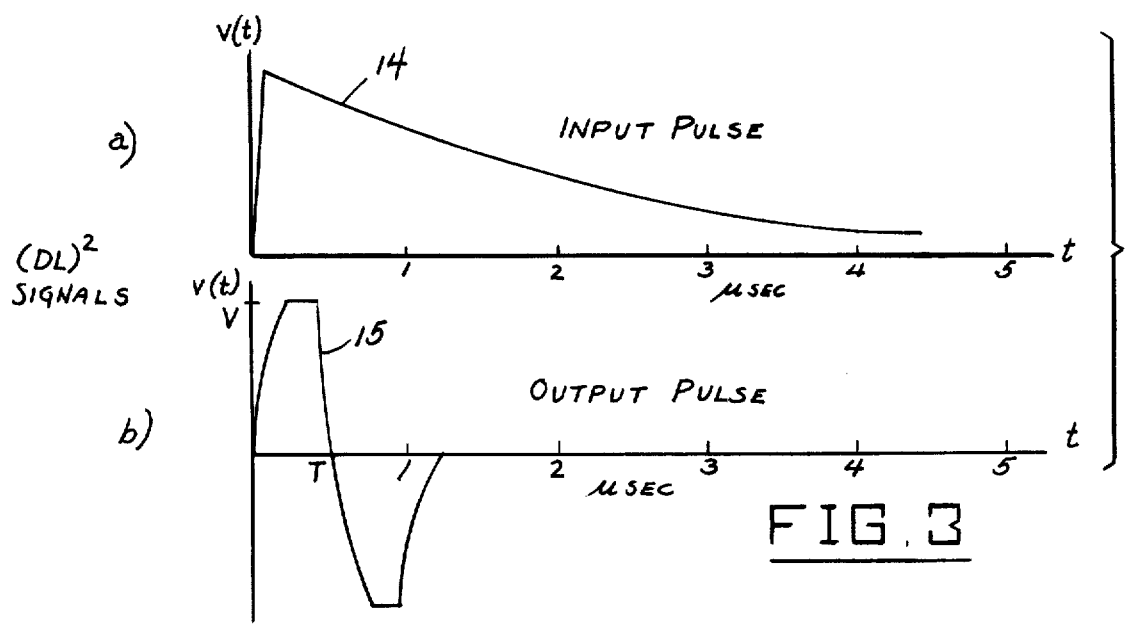
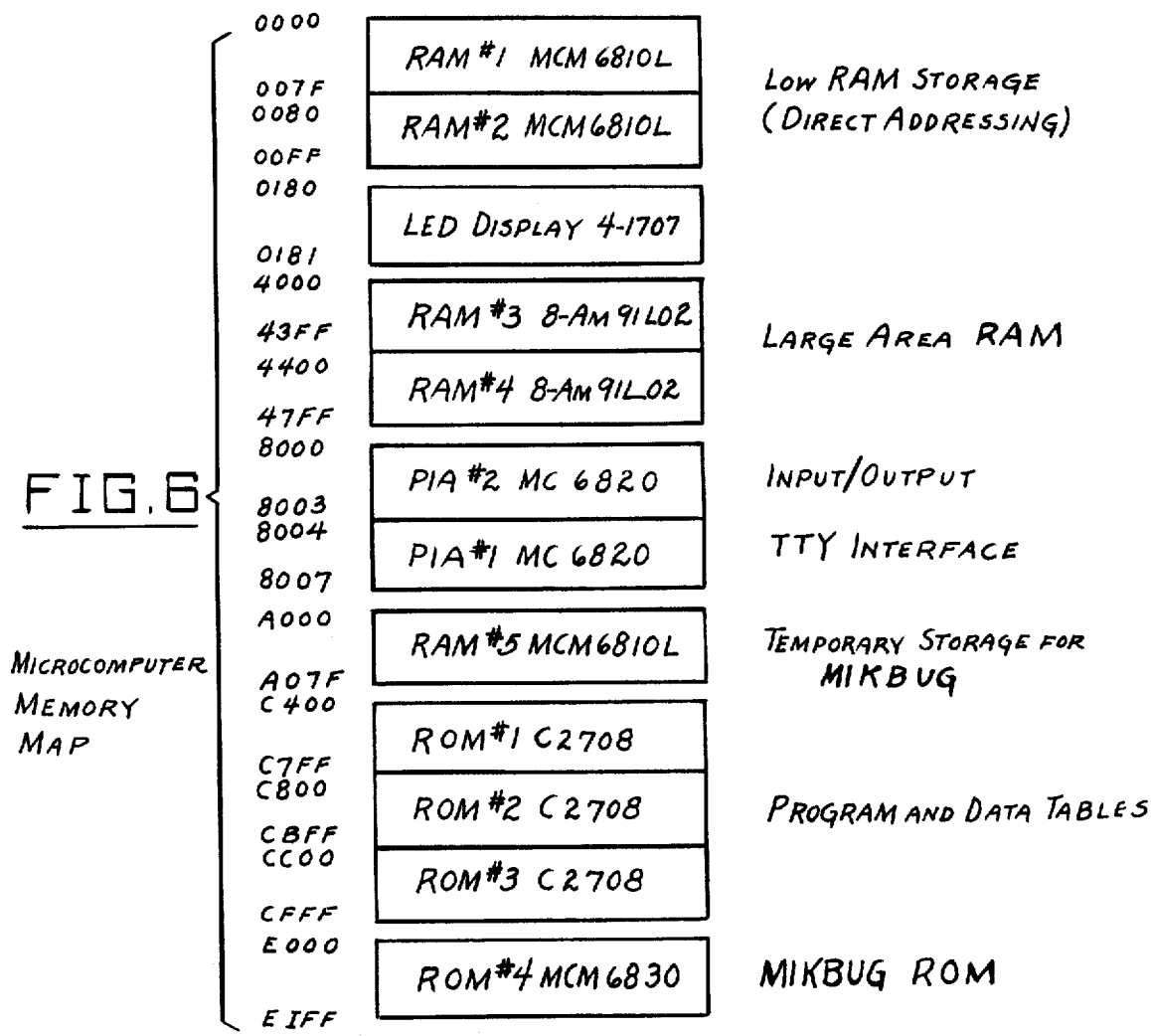

PORTABLE INSTRUMENT FOR MEASURING NEUTRON ENERGY SPECTRA AND NEUTRON DOSE IN A MIXED N-γ FIELD

The present application is a continuation-in-part of the application entitled "Portable Instrument for Measuring Neutron Energy Spectra and Neutron Dose in a Mixed n-γ Field", Ser. No. 886,465, filed Mar. 14, 1978.

FIELD OF THE INVENTION

This invention relates to instruments for measuring neutron energy spectra and neutron kerma rate, and more particularly to a portable instrument for use in intense, mixed n-γ radiation fields and which is of the type employing a scintillator and an associated photomultiplier tube for detecting the radiant energy. The terms kerma and kerma rate as used hereinafter are conventional terms defined by the International Commission on Radiation Units and Measurements, ICRU Report 19, "Radiation Quantities and Units", 7910 Woodmont Ave., Washington, D.C. 20014, pages 8, 9 (July 1, 1971).

BACKGROUND OF THE INVENTION

The fast neutron contamination associated with photon beams of high-energy medical accelerators is a matter of concern to the health community because this radiation may contribute to a significant whole-body dosage thereof to a patient undergoing therapy.

Recently there has been a trend toward the use of higher energy electron linear accelerators as X-ray sources for radio-therapy. When operated at 25 MeV in the X-ray mode, a significant fraction of the photons are capable of initiating n-γ reactions. Neutron dose rates of approximately 0.5% of the X-ray dose rate at a distance of 1 m from the target of a 25 MeV medical accelerator have been reported (1). Although the neutron dose is small, the rem dose may be biologically significant when considering the effect on the eyes (1) and other organs of the body.

In order to quantify the neutron contamination for evaluation of its biological effects, it is necessary to determine its energy spectrum. There are three major problems associated with the determination of neutron spectra from medical linacs: (a) the radiation field is a mixture of a high-intensity gamma-ray field and a low intensity field; (b) the machine operates in a pulsed mode, causing high flux rates for very short periods, typically less than 2μs; and (c) the neutron spectrum must be determined from the pulse-height distribution of the secondary particles (protons). Once the energy spectrum of the neutrons has been determined, the resultant tissue kerma rate may be calculated.

In the past, neutron spectrometry required bulky nuclear instrumentation and a minicomputer to determine the neutron energy spectrum. There is a significant need for a portable instrument capable of detecting, computing and displaying neutron spectra and kerma rate in a mixed field of radiation, and which is physically suitable for utilization at a wide range of locations or sites where such radiation is suspected to be present.

A preliminary search of the prior patented art revealed the following prior U.S. patents of interest in connection with the present invention:

Berlman et al, U.S. Pat. No. 2,795,703
Scherbatskoy, U.S. Pat. No. 2,830,189
Love et al, U.S. Pat. No. 3,129,329
Sleege, U.S. Pat. No. 3,519,822
Kawashima, U.S. Pat. No. 3,898,466
Kamburov et al, U.S. Pat. No. 4,056,725

Also of interest are the following publications, to which reference may be made in the course of the description of the present invention:

1. R. M. Wilenzich, P. R. Almond, G. D. Oliver, Jr., and C. D. DeAlmeida, "Measurements of Fast Neutrons Produced by High-Energy X-Ray Beams of Medical Electron Accelerators", Phy. Med. Biol. 18 (1973) 396.

2. M. L. Roush, M. A. Wilson and W. F. Hornyak, "Pulse Shape Discrimination", Nucl. Instr. and Meth. 31 (1964) 112.

3. D. W. Glasgow, D. E. Velkley, J. D. Brandenberger, and M. T. McEllistrem, "Pulse-Shape Discrimination for Wide Dynamic Range Neutron Scattering Experiments", Nucl. Inst. and Meth. 114 (1974) 535.

4. I. J. Taylor and J. Kalyna, "A High Speed Pulse Shape Discriminator", Nucl. Inst. and Meth. 88 (1970) 267.

5. Mike Wiles and Andre Felix, MCM6830L7 *MIKBUG/MINIBUG ROM*, Engineering Note 100, Motorola, Inc. 1975.

6. H. W. Broek and C. E. Anderson, "The Stilbene Scintillation Crystal as a Spectrometer for Continuous Fast-Neutron Spectra", Rev. Sci. Instrum. 10 (1960) 1063.

7. D. W. Jones and M. Elaine Toms, "A Neutron Spectrometer Using Organic Scintillators", NRL Report 7324, Washington, D.C., 1971.

8. J. J. Ritts, M. Solomito and P. N. Stevens, "Calculation of Neutron Fluence-to-Kerma Factors for the Human Body", Nucl. Appl. and Tech 1 (1969) 89.

9. Charles J. Daniels, "A Portable Scintillation Counter with Pulse-Shape Discrimination for Measurement of Fast Neutron Spectra and Dose in a Mixed n-γ Field", M. S. Thesis, Physics Department, University of Maryland, Mar. 29, 1977.

10. Jeffrey L. Silberberg, "Design of a Microcomputer Processing Subsystem for a Portable Neutron Spectrometer/Kerma-Rate Meter", M. S. Thesis, Electrical Engineering Department, University of Maryland, May 11, 1977.

11. Jeffrey L. Silberberg, "A Microprocessor System for a Portable Neutron Spectrometer/Kerma-Rate Meter", IEEE Transactions on Nuclear Science, Vol. NS-24, No. 1, Feb. 1977.

12. C. J. Daniels and J. L. Silberberg, "A Portable Scintillation Counter with Pulse Shape Discrimination for Measurement of Fast Neutron Spectra and Dose in a Mixed n-γ Field", IEEE Proceedings of Southeastcon '77, Williamsburg, Va., (1977) 523.

13. International Commission on Radiation Units and Measurements, "Neutron Fluence, Neutron Spectra, and Kerma", ICRU Report No. 13, 1969.

14. R. M. Fry, "Neutron Dose Conversion Factors for Radioactive Neutron Sources", Health Phys., 12 (1966) 855.

15. D. R. Johnson, "Neutron Dose Conversion Factors for AmBe and AmB Sources", Health Phys., 12 (1966) 856.

16. A. B. Smith, P. R. Fields, and J. H. Roberts, "Spontaneous Fission Neutron Spectrum of $Cf^{252}$", Phys. Rev., 108 (1957) 411.

17. J. A. Grundl, V. Spiegel, C. M. Eisenhauer, H. T. Heaton II, D. M. Gilliam, and J. Bigelow, "A Californium-252 Fission Facility for Neutron Reaction Rate Measurements", Nacl. Tech. 32 (1977) 315.

SUMMARY OF THE INVENTION

Accordingly, a main object of the invention is to provide a novel and improved portable high-speed neutron spectrometer and kerma rate measuring device which overcomes the deficiencies and disadvantages of the previously employed prior art devices.

A further object of the invention is to provide an improved neutron spectrometer system which does not involve bulky components and hence is portable, and which can be employed to accurately measure neutron energy spectra and kerma rate in intense, mixed n-γ radiation fields.

A still further object of the invention is to provide a novel and improved neutron spectrometric instrument employing a scintillation counter with pulse shape discrimination for measurement of fast neutron spectra and dose in a mixed n-γ field, and further employing a novel and improved multichannel analyzer and a microcomputer.

The instrument consists of four major components: (1) an organic scintillation detector; (2) a pulse-shape discriminator (PSD); (3) a multichannel analyzer (MCA); and (4) a microcomputer. The radiation field interacts with the organic scintillator, which is optically coupled to a photomultiplier tube (PMT). Current pulses from the tube are sent to the PSD. The PSD discriminates between recoil protons (produced by neutrons) and recoil electrons (produced by gamma rays) and places the pulse-height distribution of the recoil protons in a section of the MCA memory. The microcomputer calculates the neutron spectrum and subsequently the kerma rate from the pulse-height distribution of the recoil protons, using stored values of parameters necessary for the calculation.

The instrument is adaptable for easy portability, for example, can be assembled in a case of moderate size, such as a conventional suitcase, with compartments for storing the detector, oscilloscope, and a substantial length of cable, during transport. It can contain a Polaroid camera for securing a hard copy of the oscilloscope display, a handheld TTY terminal for numerical output of spectral data, and a modem for remote transmission of experimental data. The suitcase assembly can comprise all the components of the system, including all required power supplies, including those required for the photo-multiplier tube and the tube base. A suitably accessible control panel can be provided in the case.

BRIEF DESCRIPTION OF THE DRAWINGS

Further objects and advantages of the invention will become apparent from the following description and claims, and from the accompanying drawings, wherein:

FIG. 1 is a block diagram of an improved neutron spectrometer system according to the present invention.

FIG. 2 is a block diagram of the pulse-shape discrimination circuit employed in the system of FIG. 1.

FIG. 3 are graphs respectively showing typical double delay line (DL)² input pulse and output pulse signals obtained in the pulse-shape discrimination circuit of FIG. 2.

FIG. 6 is a microcomputer memory map indicating the address allocation over the memory space, as well as the components used, in the microcomputer of the system of FIG. 1.

DESCRIPTION OF A PREFERRED EMBODIMENT

Figure 4:
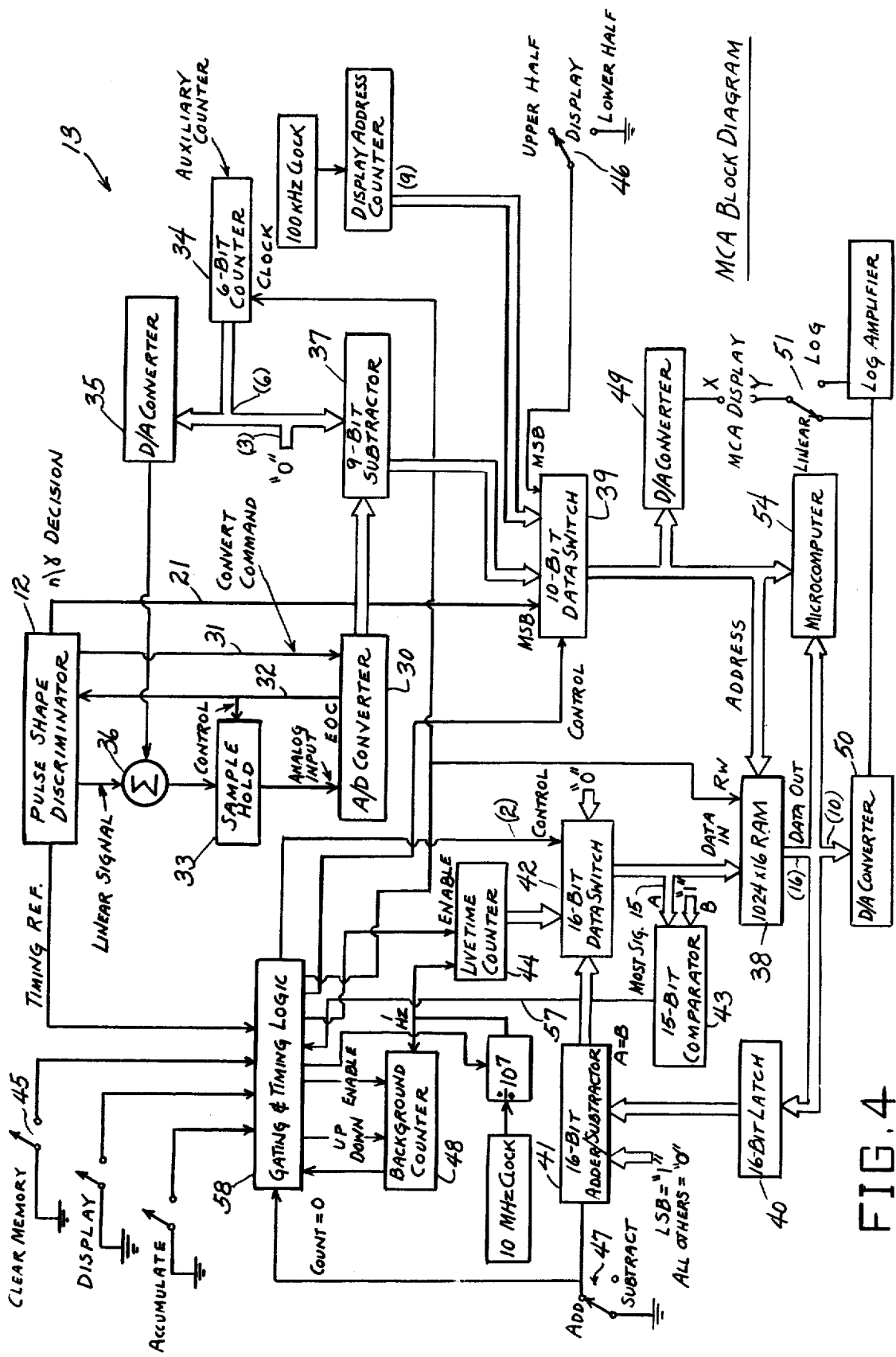
FIG. 4 is a block diagram of the multichannel analyzer circuit employed in the system of FIG. 1.
Figure 5:
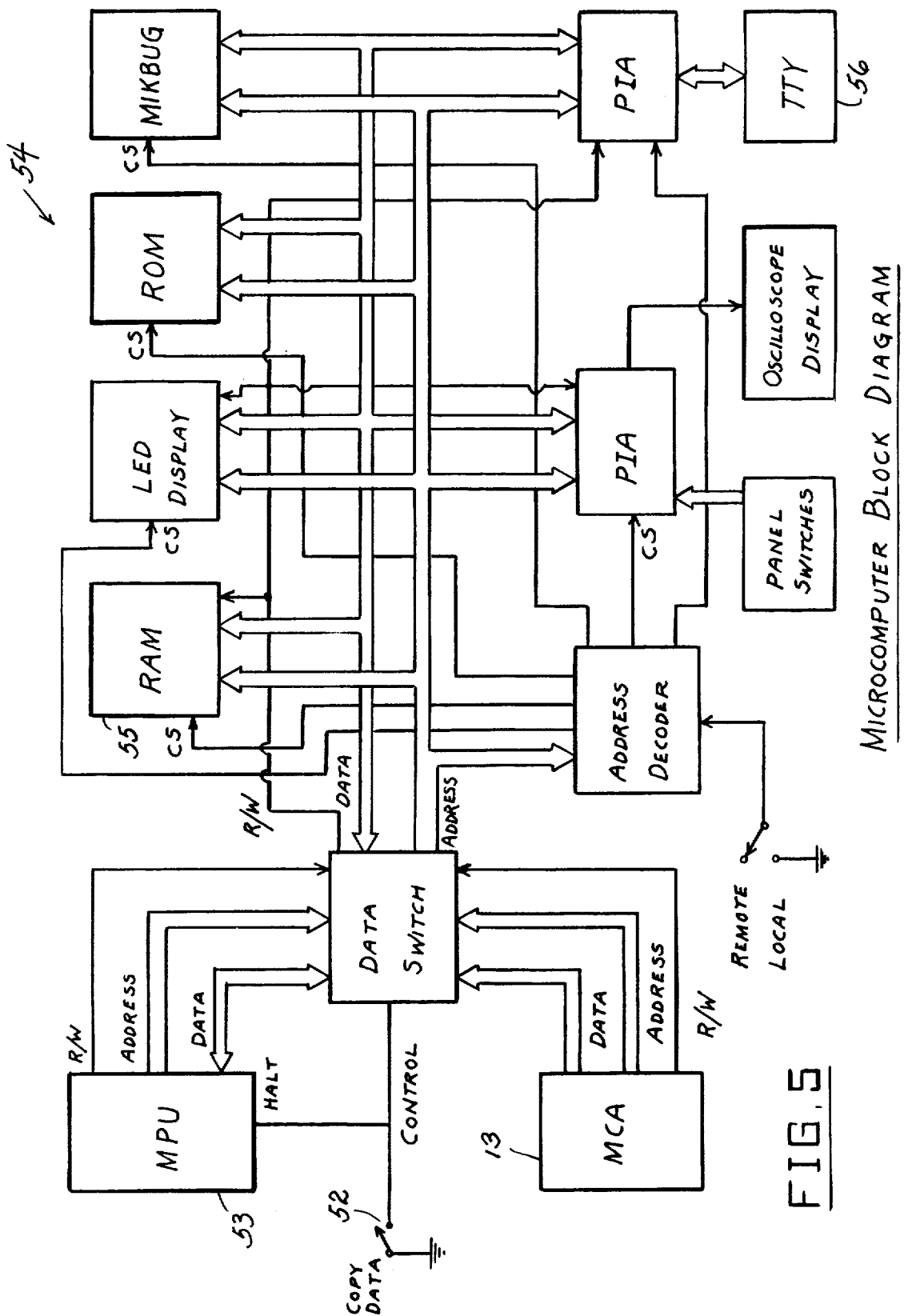
FIG. 5 is a block diagram showing the organization of the microcomputer employed in the system of FIG. 1.

The system is configured as is generally shown in FIG. 1. The detector, designated generally at 11, may consist of a 1.5"×1.5" cylindrical stilbene crystal 25 with a light-reflecting MgO coating, a 14-stage PM tube 26 (such as Amperex/Phillips 56 AVP), and an Ortec model 271 constant fraction timing PMT base 27. Light pulses in stilbene resulting from recoil electrons exhibit a larger fast decay component than those resulting from recoil protons. Consequently, stilbene is a good scintillator for use with pulse shape discrimination. The 56 AVP PM tube 26 is suitable, since it has excellent rise time characteristics and small transit-time differences. The circuitry contained in the Ortec model 271 tube base 27 preamplifies and integrates current pulses from the tenth dynode and derives a constant fraction of the pulse height trigger from the anode (timing) signal. The detector 11 is connected to the above-mentioned control panel by a suitable length of cable.

The pulse shape discriminator (FIG. 2) is designated generally at 12. This device processes linear output signals from the detector 11, determines whether the corresponding light pulses resulted from recoil protons or recoil electrons, and generates convert commands to the multichannel analyzer (MCA), designated generally at 13. The linear output of the detector 11, shown at 14 in FIG. 3, is processed by a double delay line (DL)² amplifier 28 to produce a bipolar pulse, shown at 15 in FIG. 3. The pulse 15 is identified as resulting from a recoil electron or a recoil proton by the zero-crossing time T, which is related to the amount of fast decay components in the corresponding light pulse.

In the "time" mode, the PSD 12 causes a distribution of zero-crossing times T (time spectrum) to be stored in the MCA 13 via line 21. When an anode (timing) pulse is output at 16 by the detector 11, the constant fraction discriminator CFD outputs at 17 a narrow pulse close to the leading edge of the anode pulse. After a delay of several hundred nanoseconds, the time-to-amplitude converter TAC is triggered to begin conversion. If the (DL)² output exceeds the threshold set in the lower level discriminator 24 and is not plied up, the ZCT one-shot 18 allows, via a gate 29, a pulse from the zero-crossing discriminator 19 to stop the TAC at time T. The TAC output is then proportional to the time between the start and stop pulses. The pile-up rejector 20 can resolve pulses as close as 20 nsec and is set to reject pulses from the detector 11 closer together than 1.4 microseconds.

With the PSD 12 in the "time" mode, the output of the TAC is fed via line 21 to the MCA 13 linear signal input, resulting in a zero-crossing time distribution. However, with the PSD 12 in the "energy" mode, the TAC output is used, via n/γ discriminator 23, to discriminate between the signals resulting from neutrons and those resulting from gamma rays. Using the time spectrum, the n/γ discriminator 23 is set so that recoil proton data will be stored in the lower half of the MCA 13 memory and recoil electron data will be stored in the upper half. Pulse-height distributions are then gathered using the PSD 12 in the "energy" mode. In this case, the (DL)² output 15 becomes the linear signal input to the MCA 13. If a bipolar pulse exceeds the LLD (low level discriminator) 24 threshold, is not piled up, and crosses zero within the ZCT one-shot 18 window, the MCA 13 is triggered and the channel corresponding to pulse height V (FIG. 3b) is incremented.

MULTICHANNEL ANALYZER

The multichannel analyzer (MCA) 13 is shown in block form in FIG. 4. The MCA accumulates recoil-proton and recoil-electron pulse-height distributions of 512 channels each. The maximum count in any channel is $2^{16}-2$. Processing of an input pulse requires less than 1.4 microsecond.

When the PSD 12 is in the "time" mode, the analog-to-digital (A/D) converter 30 is triggered (convert command via line 31) just after the TAC stop pulse from gate 29. The end of conversion (EOC) line 32 places the Sample Hold 33 in the "hold" mode at that time. Similarly, when the PSD 12 is in the "energy" mode, the A/D 30 is triggered and the Sample Hold 33 is placed in the "hold" mode at the approximate time the bipolar pulse 15 reaches its positive peak.

Analog-to-digital conversion requires 1 microsecond. The successive approximation technique used exhibits high speed but considerable differential nonlinearity. To correct for the differential nonlinearity of the A/D 30, a 6-bit counter 34 is used to smooth the channel encoding. The 6-bit code is converted to a voltage by a digital-to-analog (D/A) converter 35 and added to the linear signal output of the PSD 12 via an adder 36. After conversion in the 9-bit A/D 30, the same 6-bit code (plus three most significant bits of zero) is subtracted by a subtractor 37 from the A/D output, and the result addresses the random access memory (RAM) 38 via data switch 39. The 6-bit counter 34 is incremented each time data is stored in the RAM 38.

The MCA 13 includes the RAM 38, 16-bit latch 40, 16-bit adder/subtractor 41, and 16-bit data switch 42, which comprises high speed ECL electronics. The memory read-write cycle time is approximately 140 nsec.

Once a channel is addressed by the A/D 30, the contents are incremented by latching, adding 1, and storing the new value in that same RAM location. When any channel reaches the maximum of $2^{16}-2$ counts, the 15-bit comparator 43 causes the MCA 13 to automatically switch from the "accumulate" to the "display" mode. At this time, the contents of the live time counter 44 are stored in channel zero. Operation of "Clear Memory" switch 45 causes zero to be stored in the half of the RAM 38 selected by the "Upper half/Lower half" switch 46 and clears both the Background counter 48 and livetime counter 44 in the "Lower half" position only.

The background feature ("subtract" mode, controlled by switch 47) decrements channels corresponding to the input pulse heights for a period of time equal to the accumulated live time. In this manner, the background counter 48 decrements to zero, at which time the MCA 13 again automatically enters the "display" mode.

MCA display is accomplished by incrementing the memory address through the appropriate half of the RAM 38 and displaying the channel contents. The X and Y analog signals (obtained via D/A converters 49 and 50) are output to the oscilloscope to present either a linear or a log display of the pulse-height data, as controlled by a selecting switch 51.

Additional structural information relating to PSD 12 and MCA 13 will be found in Reference 9, above cited.

Summarizing, the MCA 13 is in principle equivalent to several pulse-height analyzers with their windows arranged contiguously. The process of assigning the input pulse height to one of many channels is that of analog-to-digital conversion and, in addition, there is a means of accumulating the number of events classified in each channel. A display of the total number of events classified in each channel at the completion of an experiment is the pulse-height histogram of all the pulses observed.

Once the input pulse having height $H_i$ has been coded by the A/D converter 30 into channel i, this classification is recorded by incrementing the location in the memory corresponding to channel i. The number of events which have been classified in each channel is stored in this manner as an m-bit binary word.

In the present system, which is typical, m is 16 and 512 channels are used to accumulate each pulse-height distribution. The ADC conversion time for 10 bits is about 1 $\mu$sec, and the memory read-write cycle time is approximately 140 ns.

MICROCOMPUTER

Once a pulse-height distribution has been gathered, it can be copied into the microcomputer, designated generally at 54, for processing. The "Copy Data" switch 52 halts the microprocessor 53 (MPU) and loads the pulse-height distribution displayed by the MCA 13 into the appropriate RAM locations in a direct-memory-access (DMA) mode.

The 8-bit microcomputer 54 processes recoil-proton pulse-height data into 0.2 MeV neutron-energy bins and displays the neutron spectra calculated from these data up to 20 MeV. Tissue kerma rate is calculated from the energy spectra and displayed in millirads per hour. In addition, simple diagnostic functions permit microcomputer hardware to be tested for proper operation in the field.

Present size and speed constraints in the design of the microcomputer result in a processing accuracy of 1%. A total of 3 k of read-only memory (ROM) and 2¼ k of RAM provides sufficient storage for diagnostics, calibration, and data processing. Less than one second is required to determine the neutron energy spectrum and kerma rate from a recoil-proton pulse-height distribution.

Processed or unprocessed data stored in the microcomputer RAM, shown at 55, can be output to the TTY terminal 56 or transmitted to a laboratory computer by the modem when the microcomputer is in the "remote" mode. TTY communication software is contained in the Motorola MIKBUG, an off-the-shelf ROM. When the microcomputer is in the "local" mode, it is inaccessible to TTY communication and performs as a stand-alone system.

A memory map of the microcomputer is shown in FIG. 6. The Motorola M6800 is used for the MPU and 1 k×8 ultra-violet erasable programmable ROMs contain the microcomputer software.

Diagnostics include functional tests of the 3½-digit LED display, the oscilloscope display, and microcomputer RAM and ROM. Errors detected in memory or in processing (such as divide by zero) are indicated by flashing the LED display at a 2-Hz rate.

In order to accommodate the simple algorithms used to correct for the nonlinear response of the scintillation detector 11 with respect to proton energy, it is necessary to set the gain of the $(DL)^2$ amplifier 28 such that the energy-per-channel of both pulse-height distributions is 0.02950 MeV. This is accomplished using the 1.06215 MeV Compton edge of a $^{22}$Na recoil-electron distribution and the "Calibrate" procedure (Reference 10). When the calibration routine returns a result of 37.4 to the LED display, the system is properly calibrated for accurate computation of neutron energy spectra. As stated on pages 141,142 of Reference 10, the calibrate procedure involves a few simple steps. First, a recoil-electron pulse-height distribution is gathered from a small $^{22}$Na gamma-ray source. Then the detection system gain is adjusted, the multichannel analyzer (MCA) cleared, and another pulse-height distribution gathered until the half-maximum of the 1.06215 MeV Compton edge falls in approximately channel 37, as determined visually from the MCA display. With the recoil-electron pulse-height distribution displayed and the microcomputer reset, depressing the Copy Data switch duplicates the data into RAM #4. The Calibrate command is then entered. If the LED display indicates 37, no further adjustments are necessary; if the calibration channel is not 37, the detection-system gain must be readjusted as described above and the calibration procedure repeated until 37 is displayed as the result. Recoil-proton pulse-height distributions gathered in this manner now can be processed correctly by the microcomputer for determination of neutron spectra and kerma rate.

Once the $(DL)^2$ gain has been calibrated and a recoil-proton distribution gathered, the distribution is copied into RAM #3 of the microcomputer. Correction for the nonlinear response of the detector with respect to proton energy is made using a look-up table based on the relation $P=0.19E^{1.42}$, where P is the pulse height and E is the proton energy in MeV. The entire recoil-proton spectrum is then smoothed over groups of three channels to eliminate sharp discontinuities that may be caused by poor statistics. The proton spectrum is then differentiated, normalized by the live-time, and divided by a stored array to yield the neutron energy spectrum. This array is the product of the efficiency of the detector, the detector area, and the energy-dependent corrections for edge effects and double scattering by carbon. The computed neutron spectrum, consisting of 100 data points in discrete energy steps of 0.2 MeV from 0.2 to 20.0 MeV, is output to the oscilloscope display in either a linear or log format. The display approximates linear interpolation between the discrete data points.

Tissue kerma rate is calculated by multiplying the computed neutron spectrum by an energy-dependent array of neutron fluence-to-tissue-kerma factors. These factors are well known for standard man as well as specific organs and are set out, for example, in Table II on page 93 of Ritts et al. (8). The contributions to the total kerma-rate of the individual energy bins are summed, and the resultant kerma rate is output to the LED display.

As above mentioned, in the MCA 13 the 6-bit counter 34 (FIG. 4) is used to smooth the channel encoding, namely, to correct for the differential nonlinearity of the A/D 30. The 6-bit code is converted to a voltage by D/A 35 and added via adder 36 to the linear signal output of PSD 12, the result being converted by A/D 30, the same 6-bit digital code then being subtracted from the output of A/D 30. The result is then addressed to RAM 38 via data switch 39. Once a channel in RAM 38 is addressed by the A/D 30, the contents are incremented by latching via latch 40, adding 1 via adder/subtractor 41 and storing the new value via data switch 42 in the same RAM location. When a channel reaches $2^{16}-2$ counts, comparator 43, via line 57 and logic unit 58, causes the MCA to automatically switch from the "accumulate" to the "display" mode.

The MCA 13 again automatically enters the "display" mode when the background counter 48 decrements to zero in the "subtract" mode.

Output signals for providing display of MCA data are developed at X and Y by incrementing the memory address through the appropriate half of the RAM 38, the X and Y analog signals being obtained via D/A converters 49 and 50.

Typical experimental results, and details of the mode of operation of the above-described system appear in a recent article, Jeffrey L. Silberberg et al, "Evaluation of a Portable Neutron Spectrometer/Kerma-Rate Meter" appearing in the Feb. 1978 Issue of IEEE Transactions on Nuclear Science, Vol. NS-25 #1, pages 81-85, where tests are reported in which the neutron spectrometer/kerma-rate meter was exposed to sources of mixed n-Y radiation with known output.

Potential applications for the system disclosed herein are fast neutron monitoring around reactors, nuclear bomb tests, etc. The system can be readily used to survey neutron radiation in the 0.5 to 20 MeV range, primarily in the presence of a high gamma ray flux. The system can be packaged in a 26"×18"×9" suitcase, with a weight of about 55 pounds. The flexibility inherent in incorporating a microcomputer makes improvements and additional features simple to implement. For example, the system can be adapted to monitor non-continuous sources. In particular, it is desirable to measure photoneutron leakage outside the primary beam of electron linear accelerators used in medical radiation therapy. Modifications required for this include increasing the system gain for measurement of energy below 1 MeV and gating the $(DL)^2$ input to reduce time-of-flight counting bias in pulsed n-γ fields. Possibilities for future microcomputer development include automatic calculation of γ-n ratios and computation of gamma ray spectra and dose from recoilelectron pulse-height distributions.

The foregoing description of specific embodiments will so fully reveal the general nature of the invention that others can, by applying current knowledge, readily modify and/or adapt for various applications such specific embodiments without departing from the generic concept of the present invention. Therefore, such adaptations and modifications should and are intended to be comprehended within the meaning and range of equivalents of the disclosed embodiments. It is to be understood that the phraseology or terminology employed herein is for purposes of description and not of limitation.

What is claimed is:

1. A neutron spectrometer system comprising a photomultiplier tube, radiant energy-responsive scintillator means optically coupled to said photomultiplier tube, means respectively generating "time" signal current pulses derived from the anode of the photomultiplier tube and "energy" signal pulses derived from a dynode of the photo-multiplier tube responsive to the reception of radiation including neutrons and gamma rays, pulse shape discrimination circuit means having an "energy" channel portion and a "time" channel portion, circuit means connecting said "energy" signal pulses and said "time" signal pulses respectively to said "energy" and "time" channel portions and having means to analyze the signal pulses and distinguish between pulses induced by neutrons and gamma rays, multichannel analyzer means, means to selectively connect said "energy" channel portion or said "time" channel portion to said multichannel analyzer means for selecting pulses according to their amplitudes, said multichannel analyzer means including a first group of channels for neutron-derived pulses and a second group of channels for gamma ray-derived pulses, means to sort the neutron-derived pulses into the first group and the gamma ray-derived pulses into the second group, means to store the neutron-derived pulses in said first group in a distribution according to their pulse heights, means to store the gamma ray-derived pulses in said second group of channels in a distribution according to their pulse heights, and microcomputer means to convert the pulse height distribution in said first group into a neutron energy spectrum, the storage means including a RAM, the multichannel analyzer means including an A/D converter for channel encoding, and means to correct for differential nonlinearity of the A/D converter comprising an auxiliary counter, means to increment said auxiliary counter each time data is stored in the RAM, D/A means to convert the counts in said auxiliary counter to a correction analog voltage, means to add this correction voltage to the pulse discrimination circuit means "energy" channel output to provide a resultant analog signal, A/D means to convert said resultant analog signal to a resultant digital code, means to subtract the counts of the auxiliary counter from said resultant digital code to derive a corrected resultant code, and means to address said corrected resultant code to said RAM.

2. The neutron spectrometer system of claim 1, and means to preamplify and integrate the dynode-derived pulses, said pulse shape discrimination circuit means including double-delay-line means to derive baseline crossover points from said integrated pulses, and means to measure the time difference between anode-derived current pulses and said crossover points.

3. The neutron spectrometer system of claim 1, and wherein said multichannel analyzer means has an "accumulate" and a "display" mode, and means to switch the multichannel analyzer means from the "accumulate" to the "display" mode when an addressed channel of the RAM reaches a predetermined count.

4. The neutron spectrometer system of claim 3, and wherein said switching means comprises a comparator responsive to said predetermined count.

5. The neutron spectrometer system of claim 3, and wherein said predetermined count is $2^{16}-2$.

6. The neutron spectrometer system of claim 3, and livetime counter means, and means to store the contents of said livetime counter means in the zero channel of the RAM when said predetermined count is reached.

7. The neutron spectrometer system of claim 3, and means to select the upper or lower half of the RAM for display.

8. The neutron spectrometer system of claim 3, and wherein said multichannel analyzer means includes means to increment the addressed channel of the RAM by latching, adding 1, and storing the new value in the same RAM location.

9. The neutron spectrometer system of claim 1, and data display D/A converter means to convert counter-generated RAM addresses and RAM stored data to analog display signals.

10. The neutron spectrometer system of claim 9, and wherein said D/A converter means comprises a first D/A converter directly receiving said counter-generated RAM addresses for providing an X analog display signal and a second D/A converter receiving data from the RAM for providing a Y analog display signal.

11. The neutron spectrometer system of claim 10, and means to selectively present said Y analog signal either in linear or logarithmic form.

12. The neutron spectrometer system of claim 1, and wherein said microcomputer means comprises a microprocessor, a "Copy Data" switch, and a RAM, and means to halt the microprocessor and load pulse-height distribution data from the multichannel analyzer means into appropriate RAM locations in a direct memory access mode when the "Copy Data" switch is closed.

13. The neutron spectrometer system of claim 12, and wherein the microcomputer means includes a read-only memory (ROM).

14. The neutron spectrometer system of claim 12, and wherein the microcomputer means is provided with a teletype terminal (TTY).

15. The neutron spectrometer system of claim 13, and wherein the microcomputer means is provided with LED display means for visual numerical readout.

16. The neutron spectrometer system of claim 12, and wherein the microcomputer means includes oscilloscope display means.

17. The neutron spectrometer system of claim 12, and wherein the microcomputer means includes a teletype terminal (TTY) and a peripheral interface adapter (PIA) connected between the RAM of the microcomputer means and the teletype terminal.

18. The neutron spectrometer system of claim 12, and wherein the microcomputer means includes oscilloscope display means and a peripheral interface adapter (PIA) connected between the RAM of the microcomputer means and the oscilloscope display means.

* * * * *